United States Patent
Lee et al.

(10) Patent No.: US 8,554,148 B2
(45) Date of Patent: Oct. 8, 2013

(54) DATA TRANSMISSION/RECEPTION APPARATUS AND METHOD FOR WIRELESS COMMUNICATION SYSTEM

(75) Inventors: Il-Gu Lee, Daejeon (KR); Hun-Sik Kang, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 70 days.

(21) Appl. No.: 12/884,591

(22) Filed: Sep. 17, 2010

(65) Prior Publication Data

US 2011/0069648 A1 Mar. 24, 2011

(30) Foreign Application Priority Data

Sep. 18, 2009 (KR) ........................ 10-2009-0088693

(51) Int. Cl.
*H04B 15/00* (2006.01)
(52) U.S. Cl.
USPC ........ 455/63.1; 370/242; 455/501; 455/114.2
(58) Field of Classification Search
USPC ................. 370/241, 242, 245, 252, 310, 328; 455/39, 42, 43, 501, 504, 63.1, 68, 69, 114.2, 455/115.1
See application file for complete search history.

(56) References Cited

U.S. PATENT DOCUMENTS

| | | | |
|---|---|---|---|
| 6,483,845 B1 * | 11/2002 | Takeda et al. | 370/429 |
| 7,492,789 B2 * | 2/2009 | Shvodian | 370/469 |
| 7,680,064 B2 * | 3/2010 | Nabetani et al. | 370/252 |
| 7,701,975 B1 * | 4/2010 | Tsang et al. | 370/474 |
| 2005/0227645 A1 * | 10/2005 | Sudo | 455/127.2 |
| 2006/0056362 A1 * | 3/2006 | Jang et al. | 370/336 |
| 2008/0043731 A1 * | 2/2008 | Lim et al. | 370/389 |
| 2008/0049654 A1 | 2/2008 | Otal et al. | |
| 2008/0080437 A1 * | 4/2008 | Krishnaswamy et al. | 370/338 |
| 2010/0050054 A1 * | 2/2010 | Abraham et al. | 714/776 |

OTHER PUBLICATIONS

Seongkwan Kim et al., "MCAA: A High-Throughput MAC Strategy for Next-Generation WLANs", IEEE Wireless Communications Magazines, Feb. 2008, pp. 32-39, vol. 15, Issue 1, IEEE.
Il-Gu Lee et al., "Robust Wireless Transmission Utilizing PPDU-Based Aggregation Technique for Next Generation Wireless LANs", IEEE Communications Letters, Mar. 2010, pp. 205-207, vol. 14, No. 3, IEEE.

* cited by examiner

*Primary Examiner* — Chi Pham
*Assistant Examiner* — Weibin Huang (57) ABSTRACT

Provided are apparatus and method for transmitting and receiving data for a wireless communication system. The method includes generating a first aggregation packet by controlling the number of preambles or by controlling a size of a packet according to a channel state of a channel formed to at least one reception terminal or according to a state of the reception terminal, and transmitting the first aggregation packet to the reception terminal.

19 Claims, 10 Drawing Sheets

DATA TRANSMISSION/RECEPTION APPARATUS AND METHOD FOR WIRELESS COMMUNICATION SYSTEM

CROSS-REFERENCE(S) TO RELATED APPLICATIONS

The present application claims priority of Korean Patent Application No. 10-2009-0088693, filed on Sep. 18, 2009, which is incorporated herein by reference in its entirety.

BACKGROUND OF THE INVENTION

1. Field of the Invention

Exemplary embodiments of the present invention relate to an apparatus and method for transmitting and receiving data; and, more particularly, to an apparatus and method for transmitting and receiving data for a wireless communication system.

2. Description of Related Art

In general, a communication system is categorized to a wired communication system and a wireless communication system. In case Of the wired communication system, a terminal and a network are connected through a wired link and stably transmit and receive data in a high speed. However, the wired communication system has a limitation in user mobility. In case of the wireless communication system, a terminal and a network transmit data using a predetermined frequency. Accordingly, a data transmit rate is slower than that of the wired communication system. However, there is no limitation in user mobility.

Due to rapid progress in a wireless communication technology, packet based high speed wireless communication systems have been introduced lately. Further, there have been many studies and researches made to develop various methods for transmitting data further efficiently and more quickly. In general, methods for controlling a transmission power adaptively to a channel state have been used to improve a packet transmit rate in a wireless communication system. However, there is a limitation to improve the packet transmit rate only using such methods. Therefore, there have been demands for developing methods for improving a packet transmit rate.

Lately, many studies have been made to develop methods for improving a packet transmit rate using various schemes. In general, a wireless communication system is divided into a physical layer (PHY) and a Medium Access Control (MAC) layer. In the PHY layer, a complex technology is used to improve reliability of transferring information and a data transmit rate.

In order to configure an ultra wideband wireless communication system, a high speed wireless transmission technology using a MIMO OFDM high speed wireless transmission technology, a channel coding method, and a high order modulation scheme have been employed at the PHY layer. In the MAC layer, a protocol for proving a high quality service to a user is defined, such as a Block Ack scheme and an Aggregation mode scheme for providing high throughput. In the aggregation mode, a plurality of packets are aggregated to one long packet in order to transmit the plurality of packets at once by transmitting the long aggregation packet at once.

For example, International Double Balanced Standard IEEE 802.11n introduces a 64-QAM high order modulation scheme and a channel coding method having a high coding rate such as a 5/6 code rate into a PHY layer. Further, IEEE 802.11n increases a data transmit rate up to 300 Mbps at a PHY layer by applying a multiple antennas OFDM modulation scheme. Further, as a standard, IEEE 802.11n selects a technology for sustaining throughput up to about 200 Mbps of a data transmit rate at a MAC layer using a Block Ack scheme and an Aggregation mode at a MAC layer in order to reduce an overhead generated due to a gap between a header and a frame.

It is possible to achieve high throughput theoretically by employing a Block Ack scheme and an Aggregation mode as standard in IEEE. However, such a high throughput cannot be achieved in a real wireless environment. In the Double Balanced Transmission scheme, a signal is transmitted with 64 QAM modulation scheme and a 5/6 code rate through multiple antennas. Comparatively, a channel may become unstable during a long packet period because a required SNR is not sustained for the long packet period at a receiver end. Also, small error propagation is required to achieve high throughput at a receiver end in a WLAN system.

SUMMARY OF THE INVENTION

An embodiment of the present invention is directed to a data transmission and reception apparatus and method for providing high throughput in a wireless communication using an aggregation mode.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for transmitting data for a wireless communication system includes generating a first aggregation packet by controlling the number of preambles or by controlling a size of a packet according to a channel state of a channel formed to at least one of reception terminals or according to a state of the reception terminal, and transmitting the first aggregation packet to the reception terminal.

In accordance with another embodiment of the present invention, a method for transmitting data for a wireless communication system includes: generating a aggregation packet; and transmitting the aggregation packet by controlling a data transmit rate according to a channel state of a channel formed to at least one reception terminal and a state of the reception terminal.

In accordance with another embodiment of the present invention, an apparatus for transmitting data for a wireless communication system, includes a data processor configured to generate a first aggregation packet by controlling the number of preambles or by controlling a size of packet according to a channel state of a channel to at least one of reception terminals or according to a state of the reception terminal, and a data transmitter configured to transmit the first aggregation packet to the reception terminal.

In accordance with another embodiment of the present invention, a method for receiving data for a wireless communication system, includes receiving a first aggregation packet from a transmission terminal, transmitting error information for the first aggregation packet to the transmission terminal, and receiving a second aggregation packet from the transmission terminal, wherein the second aggregation packet is an aggregation packet with the number of preambles or a size of a packet controlled according to the error information.

In accordance with another embodiment of the present invention, an apparatus for receiving data for a wireless communication system, includes a data receiver configured to receive first and second aggregation packets from a transmission terminal, and an information transmitter configured to transmit error information for the first aggregation packet to the transmission terminal, wherein the second aggregation packet is an aggregation packet with the number of preambles or a size of packet controlled according to the error information.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

The present invention relates to a data transmission and reception apparatus for providing high throughput in a wireless communication system using an aggregation mode and a method thereof. Although a transmission terminal generates an aggregation packet using an aggregation mode as described above, high throughput may not be achieved according to a channel state.

In an aggregation mode, a transmission terminal generates a plurality of packets to transmit data, aggregates the plurality of generated packets to one long packet, and transmits the long aggregation packet to a reception terminal. A reception terminal receives the transmitted long aggregation packet from the transmission terminal, demodulates and decodes the received long aggregation packet, and determines a reception error in the decoded packet. The reception terminal uses a Block Ack scheme to determine a reception error in a plurality of packets included in the received long aggregation packet and informs the transmission terminal of the determination result. That is, the aggregation mode improves the throughput because a plurality of packets are transmitted at once and an acknowledgment therefore is transmitted as a block Ack.

When the block Ack informs the transmission terminal that the reception error is occurred in the previously transmitted packets, the transmission terminal retransmits packets. Accordingly, a reception success rate of a packet is improved. However, such retransmission of packets becomes a factor to decrease throughput. Accordingly, it is required to reduce retransmission to effectively transmit data.

However, a long packet such as an aggregation packet may have a packet error rate (PER) higher than that of a short packet due to noise and frequency selective property of a real channel and a time/frequency offset in a radio frequency (RF) and analog path. That is, the packet error rate may increase when a channel state is poor. When a reception terminal has a poor state caused by residual error propagation, an error correction rate of a long packet may become decreased and a packet error rate of a last part of a long packet may become increased.

In order to overcome such problem, a data transmission and reception apparatus in accordance with an embodiment of the present invention generates an aggregation packet by controlling the number of preambles and controlling a size of a packet according to a channel state of a channel between a transmission terminal and a reception terminal or a state of a reception terminal. Accordingly, throughput can be improved. The data transmission and reception apparatus in accordance with an embodiment of the present invention controls the number of preambles by controlling a cycle of a preamble inserted into an aggregation packet and controls a size of the aggregation packet by controlling the number of packets to be aggregated.

In an embodiment of the present invention, a reception terminal receives an aggregation packet with the increased number of packets when a channel state is poor. Accordingly, the reception terminal can further frequently estimate a channel state using more preambles. Accordingly, efficiency in demodulating and decoding a packet is increased and throughput is improved. When error is concentrated at the last part of an aggregation packet because a state of a reception terminal is poor, a size of an aggregation packet is controlled to be shorter. Accordingly, an error generation rate can be reduced in a reception terminal receiving such a size controlled aggregation packet. Accordingly, the number of times retransmitting a packet can be reduced, and throughput can be improved.

That is, a data transmission and reception apparatus in accordance with an embodiment of the present invention improves throughput by increasing the number of preambles or by reducing a length of an aggregation packet because an error generation part increases when a channel state is poor or when a reception terminal has a poor state.

On the contrary, when a channel has a good channel state or when a state of a reception terminal is good, a data transmission and reception apparatus in accordance with an embodiment of the present invention reduces the number of preambles or increases a length of an aggregation packet. When the number of preambles is reduced, an amount of data included in an aggregation packet is increased, thereby reducing MAC overhead. Therefore, when a channel has a good channel state and when a state of a reception terminal is good, a transmission terminal transmits more data to a reception at once and reduces MAC overhead in an embodiment of the present invention. Therefore, throughput is improved.

A data transmission and reception apparatus in accordance with an embodiment of the present invention uses not only a determination result of error generation in a channel or a reception terminal but also various link quality matrixes to check a channel state and a state of a reception terminal. Such link quality matrixes may include Doppler frequency shift according to a moving speed of a terminal, a channel coherence time, a signal to noise ratio (SNR), a reception signal power, path loss between a terminal and an access point, and a distance between a terminal and an access point.

For example, a data transmission and reception apparatus in accordance with an embodiment of the present invention uses a lookup table having information about link quality indexes varying according to a moving speed of a terminal or a threshold comparison method. That is, a data transmission and reception apparatus in accordance with an embodiment of the present invention uses a preamble insertion cycle lookup table having information about an optimal preamble insertion cycle according to a maximum Doppler frequency shift value.

In an embodiment of the present invention, a preamble insertion cycle may be decided according to a channel coherence time. If a coherence time is longer than a packet having one preamble by determining a valid performance for a length of a packet corresponding to a preamble, a data transmission and reception apparatus in accordance with an embodiment of the present invention lengthens a preamble insertion cycle. If a coherence time is shorter than a packet having one preamble by determining a valid performance for a length of a packet corresponding to a preamble, a data transmission and reception apparatus in accordance with an embodiment of the present invention shortens a preamble insertion cycle.

Further, a preamble insertion cycle may be controlled according to an estimated signal to noise ratio (SNR). In order to control the preamble insertion cycle according to a SNR, a data transmission and reception apparatus in accordance with an embodiment of the present invention may include a lookup table having information about preferred preamble insertion cycles according to SNRs.

Meanwhile, in an embodiment of the present invention, an aggregation packet may be transmitted to a reception terminal by controlling a data transmit rate according to a channel station of a channel formed between a transmission terminal and a reception terminal or a state of a reception terminal. An error generation rate becomes more sensitive as a data transmit rate increases. Therefore, in an embodiment of the present invention, an aggregation packet is transmitted by decreasing a data transmit rate when a channel state is poor or a state of a reception terminal is poor. Further, when a channel state is normal or when a state of a reception terminal is normal, an aggregation packet may be transmitted by increasing a data transmit rate in an embodiment of the present invention. Here, the data transmit rate may be controlled by controlling a bandwidth or a Modulation and Coding Scheme (MCS) level.

Further, in an embodiment of the present invention, an aggregation packet may be transmitted to a reception terminal by controlling a data transmit rate of an aggregation packet generated in a normal aggregation mode. That is, generation of an aggregation packet and control of a data transmit rate may be performed simultaneously or independently.

Hereinafter, an apparatus and method for transmitting and receiving data in accordance with an embodiment of the present invention will be described with reference to FIGS. 1 to 11. Hereinafter, a data transmission and reception apparatus includes a terminal, a station, and an access point (AP).

Figure 1:
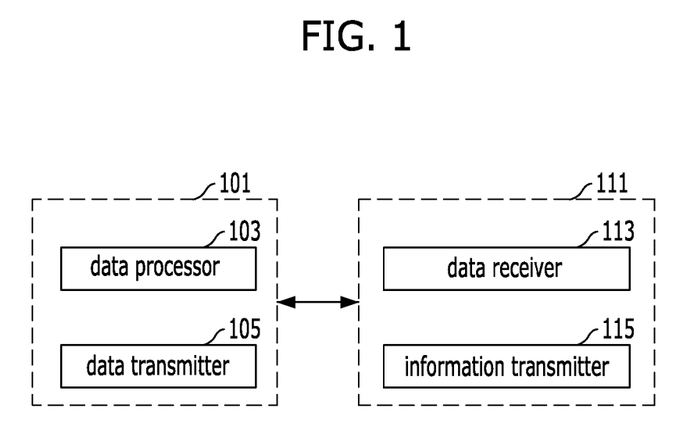
FIG. 1 is a diagram illustrating a wireless communication system in accordance with an embodiment of the present invention.

FIG. 1 is a diagram illustrating a wireless communication system in accordance with an embodiment of the present invention.

As shown in FIG. 1, the wireless communication system in accordance with an embodiment of the present invention includes a transmission terminal 101 and a reception terminal 111. The transmission terminal 101 includes a data processor 103 and a data transmitter 105. The reception terminal 111 includes a data receiver 113 and an information transmitter 115. Hereinafter, the transmission terminal 101 and the reception terminal 111 will be described in detail.

The data processor 103 generates a first aggregation packet by controlling the number of preambles or a size of a packet according to a channel state of a channel between the transmission terminal 101 and the reception terminal 111 or a state of the reception terminal 111. That is, the data processor 103 controls the number of preambles inserted into a first aggregation packet or controls a size of the first aggregation packet according to the channel state or the state of the reception terminal 111. Then, the data, transmitter 105 transmits the generated first aggregation packet to the reception terminal 111.

Meanwhile, the transmission terminal 101 may use error information of an aggregation packet transmitted to the reception terminal 111 in order to determine the channel state between the transmission terminal and the reception terminal 111 or a state of the reception terminal 111. As described above, the error information may include information about a channel state between the transmission terminal 101 and the reception terminal 111 or the state of the reception terminal 111 because an error generation frequency or an error distribution rate is different according to the channel state between the transmission terminal 101 and the reception terminal 111 or the state of the reception terminal 111.

The transmission terminal 101 may further include a data receiver for receiving error information from the reception terminal 111, where includes error information about a second aggregation packet transmitted from the transmission terminal 101 to the reception terminal 111. That is, the transmitter 105 transmits a second aggregation packet to the reception terminal 111, and the data receiver receives error information about the second aggregation packet from the reception terminal 111. The reception terminal 111 may transmit a Block Ack including the error information to the transmission terminal 101.

Particularly, the data processor 103 controls the number of preambles by comparing the number of error packets of the second aggregation packet and a predetermined threshold using the error information in order to control preambles included in the first aggregation packet. That is, the data processor 103 determines the number of error packets among the second aggregation packets using the error information and generates a first aggregation packet by increasing the number of preambles when the error generation rate is greater than the predetermined threshold value. Here, the data processor 103 may control the number of preambles by controlling the preamble insertion cycle for the first aggregation packet.

Alternately, the data processor 103 compares the error distribution of the second aggregation packet with a predetermined threshold value using the error information and controls the size of the first aggregation packet by controlling the number of packets included in the first aggregation packet according to the comparison result. Reducing a size of the first aggregation packet is equivalent to shortening a length of the first aggregation packet. Therefore, errors concentrated on the last part of an aggregation packet may be eliminated. For example, when errors are only generated in a $90^{th}$ packet to a $100^{th}$ packet included in an aggregation packet, which is generated by aggregating 100 packets, such errors generated in the $90^{th}$ packet to the $100^{th}$ packet can be eliminated by aggregating only 90 packets to an aggregation packet.

The data processor 103 may reduce the size of the first aggregation packet when errors are concentrated at the last packet part of the second aggregation packet. For example, the data processor 103 controls the size of the first aggregation packet by comparing an error generation rate at a predetermined part of the second aggregation packet with a predetermined threshold value. Here, the predetermined part may be an $N^{th}$ packet to the last packet included in the second aggregation packet, where N denotes a predetermined number. For example, if at least six packets from the $90^{th}$ packet to the $100^{th}$ packet have errors generated, and if the predetermined threshold value is 5, the data processor 101 reduces the size of the first aggregation packet.

The transmission terminal 101 may further includes a modulation and encoding unit for modulating and encoding the first aggregation packet according to a predetermined communication scheme. The data transmitter 105 receives the modulated and encoded first aggregation packet to the reception terminal 111. Here, the transmission terminal 101 may transmit an aggregation packet by controlling a data transmit rate according to a channel state of a channel formed to a reception terminal and a state of a reception terminal, as described above. The modulation and decoding unit controls a modulation and coding scheme, to control the data transmit rate.

The data receiver 113 receives the first and second aggregation packets from the transmission terminal 101. The information transmitter 115 transmits error information about the second aggregation packet to the transmission terminal 101. The reception terminal 111 may include the error information into a Block Ack for the second aggregation packet and transmit the Block Ack to the transmission terminal 101. As described above, the first aggregation packet may be a packet with the number of preambles controlled or the size thereof controlled according to the error information.

The reception terminal 111 may further include a channel estimator for estimating a channel state using a preamble of an aggregation packet transmitted from the transmission terminal 101. As described above, the reception terminal 111 may estimate a channel state using preambles which are controlled in the number according to a channel state or a terminal state.

Meanwhile, the controlling the number of preambles and the controlling the size of the aggregation packet may be selectively performed or performed at the same time. Furthermore, the wireless communication system may be a wireless local area network (WLAN) system or a Multi-User Multiple Input Multiple Output (MU-MIMO) WLAN system. The transmission terminal may transmit an aggregation packet to at least one reception terminal by using a multichannel or by beam-forming according to a channel state of a channel formed to at least one reception terminal or a state of a reception terminal.

Figure 2:
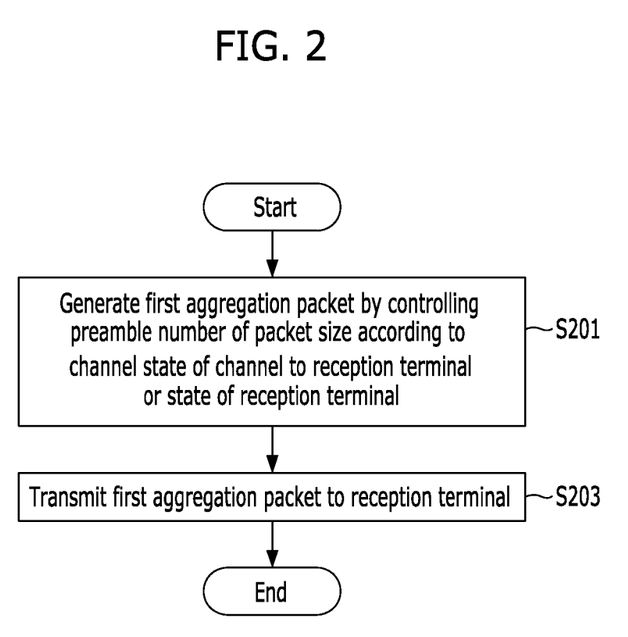
FIG. 2 is a flowchart illustrating a method for transmitting data in accordance with an embodiment of the present invention.

FIG. 2 is a flowchart illustrating a method for transmitting data in accordance with an embodiment of the present invention.

Referring to FIG. 2, at step S201, the transmission terminal 101 generates a first aggregation packet by controlling the number of preambles or the size of a packet according to a channel state between the transmission terminal 101 to the reception terminal 111 or a state of the reception terminal 111. At step S203, the transmission terminal 101 transmits the first aggregation packet to the reception terminal 111. The transmission terminal 101 may transmit an aggregation packet to the reception terminal by controlling a data transmit rate according to a channel state of a channel formed to the reception terminal or according to a state of the reception terminal.

The transmission terminal 101 determines a channel state between the transmission terminal 101 and the reception terminal 111 and a state of the reception terminal 111 using error information transmitted from the reception terminal 111. Based on the error information, a second aggregation packet may be transmitted to the reception terminal 111 and the transmitted second aggregation packet may be received at the transmission terminal 111. In an embodiment of the present invention, a first aggregation packet may be generated by controlling the number of preambles to be included in the first aggregation packet or by controlling a size of the first aggregation packet using the error information.

In order to control the number of the preambles included in the first aggregation packet, the step S201 may include comparing the number of error packets for the second aggregation packet with a predetermined threshold value using the error information, controlling the number of preambles according to the comparison result, and generating the first aggregation packet including the controlled number of preambles. Here, the transmission terminal 101 can control the number of preambles by controlling a preamble insertion cycle for the first aggregation packet.

In order to control the size of the first aggregation packet, the step S201 may include comparing error distribution of the second aggregation packet with a predetermined threshold value using the error information; deciding a size of the first aggregation packet according to the determination result, and generating the first aggregation packet by controlling the number of packets included in the first aggregation packet. The transmission terminal 101 may decide the size of the first aggregation packet by comparing an error generation rate in a predetermined number of packet to the last packet included in the second aggregation packet with a predetermined threshold value.

Figure 3:
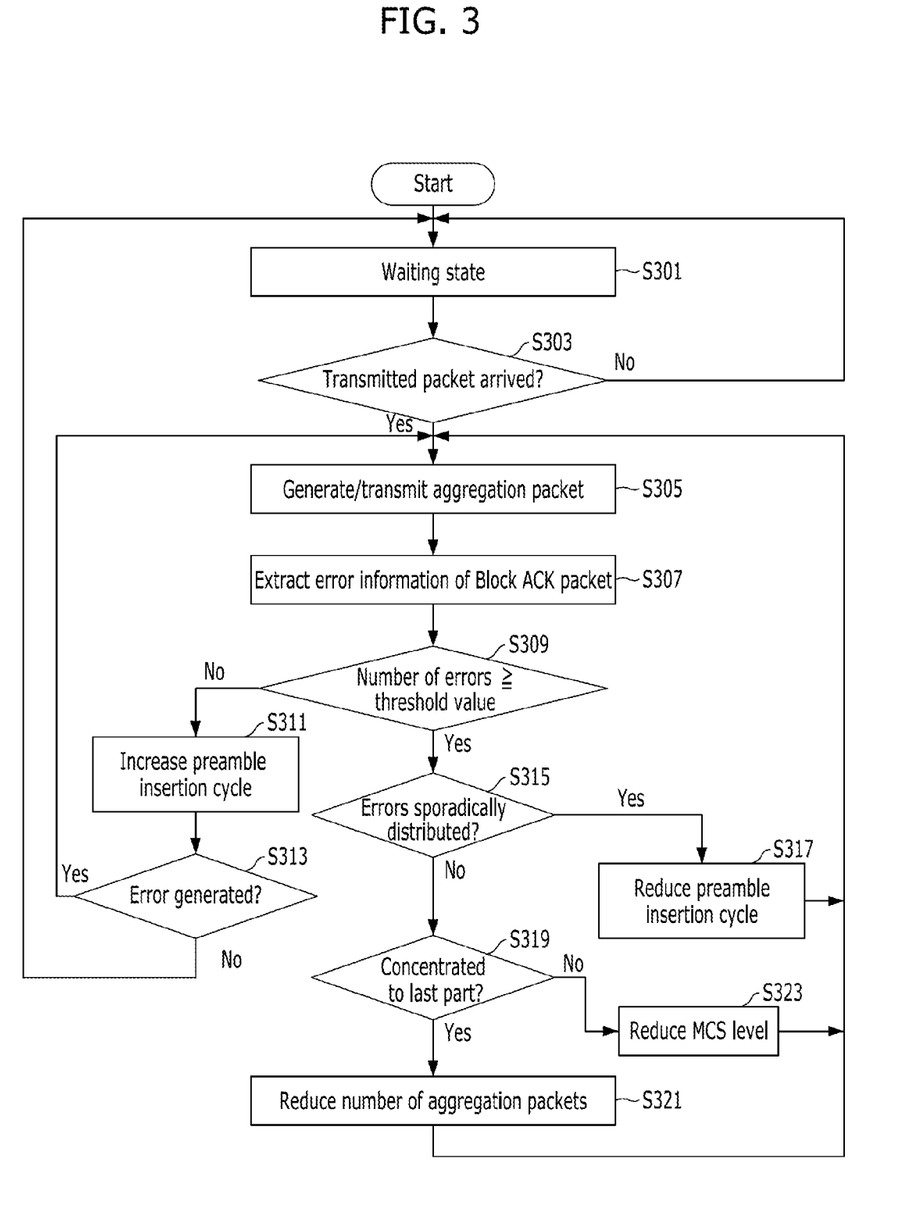
FIG. 3 is a flowchart illustrating a data transmission method in accordance with an embodiment of the present invention.

FIG. 3 is a flowchart illustrating a data transmission method in accordance with an embodiment of the present invention. A data transmission method of a data processor 103 of FIG. 1 will be described with reference to FIG. 3.

The data processor 103 sustains an initial waiting state at step S301. Here, the initial waiting state means a state of waiting receiving or transmitting data. In the step S301, the data processor 103 waits for receiving a packet from the upper layer and waits for a reception packet or a response signal from a PHY layer. In FIG. 1, the data processor 103 of the transmission terminal corresponds to the MAC layer, and the data transmitter 103 corresponds to the PHY layer. In the embodiment of the present invention, the waiting state of the data processor 103 may be a state of waiting for receiving a packet to be transmitted from the upper layer.

At step S303, the data processor 103 determines whether or not a packet to be transmitted is arrived from an upper layer when a predetermined event is generated. Here, the predetermined event may be packet transmission to the reception terminal 111 or packet retransmission.

When a packet to be transmitted to the reception terminal 111 is arrived from the upper layer, the data processor 103 generates an aggregation packet using a plurality of packets to be transmitted to the reception terminal 111, and transmits the generated aggregation packet to a PHY layer at step S305. Here, the aggregation packet may be an aggregation packet of IEEE 802.11n or an aggregation packet generated according to an embodiment of the present invention.

The aggregation packet transmitted to the PHY layer is transmitted to the reception terminal 111 and the data processor 103 extracts error information from a Block Ack transmitted from the reception terminal 111 at step S307. The data processor 103 determines a packet having an error among the aggregation packet and error distribution thereof using the extracted error information.

The data processor 103 determines whether the number of error packets is greater than a predetermined threshold value using the error information. Such a threshold value may be optimized through experiments. When the number of error packets is smaller than a threshold value, the data processor 103 reduces the number of preambles to be inserted in the aggregation packet by increasing the preamble insertion cycle at step S311. Information about a preamble insertion cycle may be stored in the transmission terminal 101. When the number of preambles to be inserted in the aggregation packet is reduced, the length of the aggregation packet may be shortened. Accordingly, throughput may be improved.

An aggregation packet including the reduced number of preambles is transmitted to the reception terminal 111, and the data processor 103 determines whether error is generated or not based on the Block Ack transmitted from the reception terminal 111 at step S313. When it is determined that the error is generated, the data processor 103 may control the preamble insertion cycle at the step S305. If not, the data processor 103 sustains a waiting state at step S301.

If the number of error packets is greater than a predetermined threshold value at step S309, the data processor 103 determines whether error packets are sporadically distributed or not at step S315. Sporadic distribution of error packets means that a channel state is not stable. That is, it is very difficult for a reception terminal to accurately estimate a channel state when a channel varies abruptly in a time domain. Therefore, error may be generated sporadically.

When error packets are sporadically distributed, the data processor 103 increases the number of preambles to be inserted in to an aggregation packet by reducing the preamble insertion cycle at step S317. The channel estimation at a receiving end may become easier or modulation and encoding efficiency may become increased as the number of preambles to be inserted into an aggregation packet increases. Information about a preamble insertion cycle may be included in the transmission terminal 101. The data processor 103 may generate an aggregation packet according to the increased preamble insertion cycle and transmit the generated aggregation packet to a PHY layer at step S305.

When it is determined that the error packets are not sporadically distributed at step S315, the data processor 103 determines whether the error packets are concentrated to a last part of the generated aggregation packet or not at step S319. The data processor 103 determines whether a error packet is concentrated to a predetermined part or not at step S313 and S315. When the number of packets to be aggregated is comparatively large, the length of the aggregation becomes long. Errors may be concentrated to a last part of an aggregation packet according to a state of the reception terminal 111. Therefore, the data processor 103 determines error distribution.

When it is determined that errors are concentrated to the last part of the aggregation packet at step S319, the data processor 103 may decide to reduce the number of packets to be aggregated and store the information thereof in the transmission terminal 101. The data processor 103 generates an aggregation packet according to the reduced number of packets at step S305. Since the length of the aggregation packet is shortened according to the reduced number of packets, errors generated at the last part of the aggregation packet may be eliminated.

Meanwhile, when the errors are not concentrated to the last packet part at step S319, the modulation and encoding unit reduces a modulation and coding scheme (MCS) level at step S323. That is, the modulation and encoding unit controls a data transmit rate by controlling a modulation and coding scheme. The MCS level may be setup according to predetermined rule of a wireless communication system.

Figure 4:
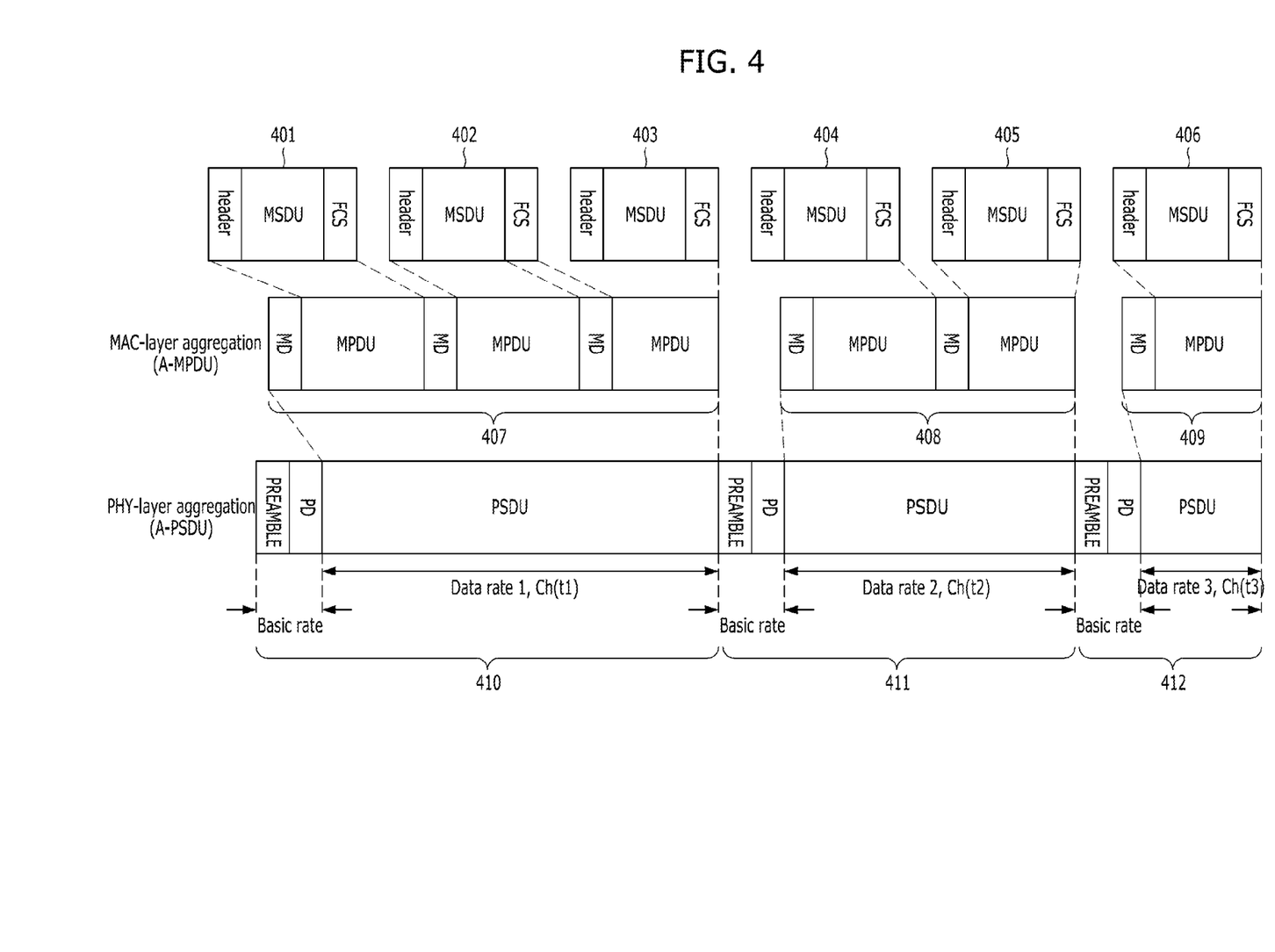
FIG. 4 is a diagram illustrating an aggregation packet in accordance with an embodiment of the present invention.

FIG. 4 is a diagram illustrating an aggregation packet in accordance with an embodiment of the present invention. Hereinafter, a MAC layer corresponds to the data processor 103 and a PHY layer corresponds to the data transmitter 105.

A plurality of service data units (SDU) 401 to 406 are transmitted from an upper layer of a MAC layer to the MAC layer. In FIG. 4, MSDU, denotes a service data unit SDU. As shown, the plurality of SDUs 401 to 406 include a header and a frame check sequence (FCS) for CRC check.

The MAC layer generates a packet data unit (PDU) using the plurality of SDUs 401 to 406, which are shown as MPDU in FIG. 4. Each MPDU includes MPDU Delimiter (MD). The MAC layer generates an aggregation packet A-MPDU using the MPDU. For example, the MAC layer generates a first aggregation packet 407 using three MSDU 401 to 403, generates a second aggregation packet 408 using two MSDUs 404 to 405, and generates a third aggregation packet 409 using one MSDU 406 as shown in FIG. 4.

The aggregation packet generated in the MAC layer is transmitted to the PHY layer. The PHY layer, as shown in FIG. 4, aggregates the aggregation packets generated in the MAC layer and transmits the aggregated aggregation packet to a reception terminal. That is, the aggregation packets 407 to 409 from the MAC layer may be configured as a plurality of PSDUs 410 to 412 including a preamble and a PPDU Delimiter (PD) in the PHY layer, and the plurality of PSDUs 410 to 412 may be aggregated.

Here, the number of preambles may be decided according to a method in accordance with an embodiment of the present invention. Also, each PSDU may be transmitted to different reception terminals. That is, each PSDU may include a different MAC address or a packet for different reception terminal. Different reception terminals receive aggregation packets A-PPDU transmitted by the PHY layer and decode a PSDU according to a MAC address thereof.

Further, each PSDU may be transmitted to a reception terminal with different data transmit rates data rate 1, data rate 2, and data rate 3. That is, when a transmission terminal and a plurality of reception terminals are transmitting and receiving data using different channels or by beam-forming, the transmission terminal may transmit an aggregation packet A-PPDU by controlling a data transmit rate by a PSDU according to a multichannel state. Here, a destination of each PSDU may be different as described above.

Meanwhile, preambles and a header of an aggregation packet A-PPDU generated in a PHY layer may be transmitted at a predetermined base rate. Further, the number of packets aggregated in the MAC layer and the PHY layer may be controlled according to an embodiment of the present invention.

Figure 5:
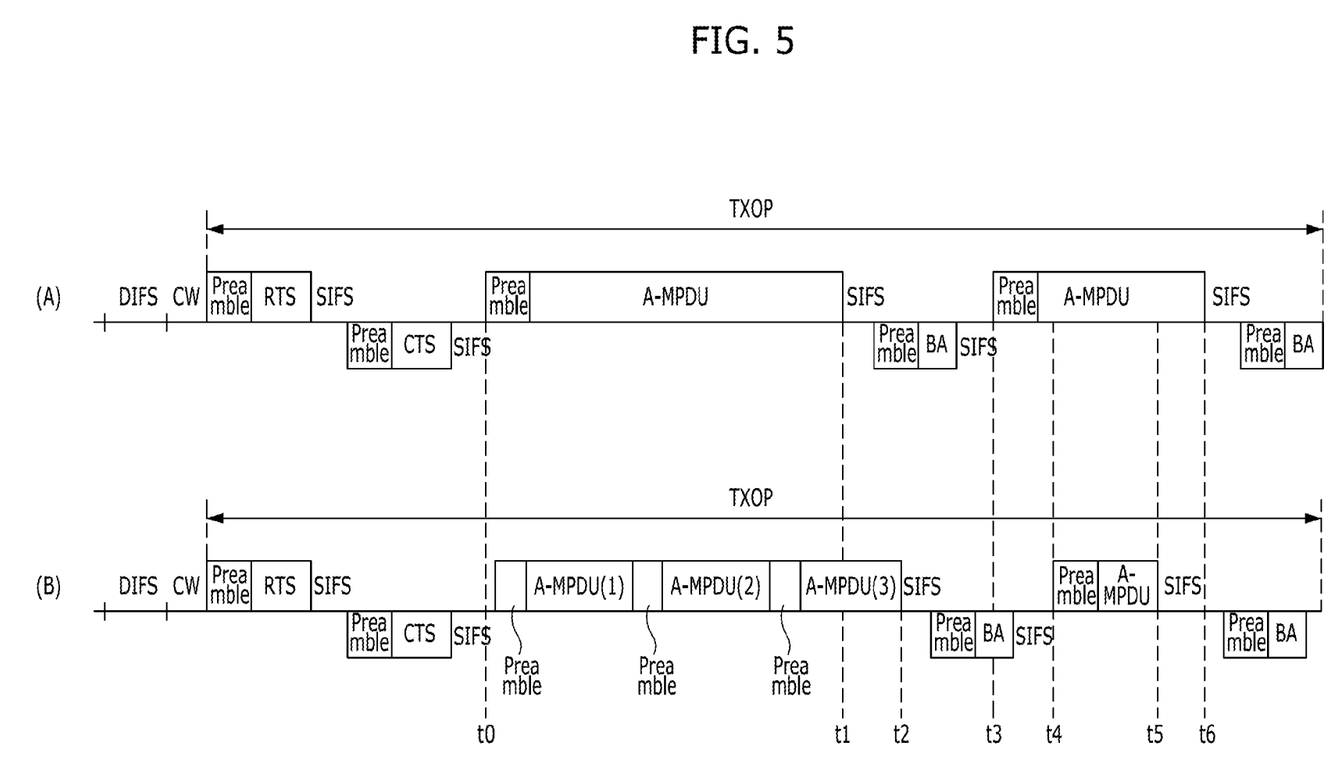
FIG. 5 is a timing diagram illustrating a typical data transmission and reception method and a data transmission and reception method in accordance with an embodiment of the present invention.

FIG. 5 is a timing diagram illustrating a typical data transmission and reception method and a data transmission and reception method in accordance with an embodiment of the present invention. In FIG. 5, a timing diagram A shows the typical data transmission and reception method, and a timing diagram B shows the data transmission and reception method in accordance with an embodiment of the present invention. In each diagram, upper frames on a horizontal line denote frames transmitted from a transmission terminal, and lower frames under the horizontal line denote frames transmitted from a reception terminal.

The transmission terminal transmits a request to send (RTS) frame to the reception terminal at a Transmit opportunity (TXOP)period, and the reception terminal transmits a clear to send (CTS) frame to the transmission terminal as acknowledgment. At a time t0, the transmission terminal transmits an aggregation packet to the reception terminal and the reception terminal transmits a Block Ack to the transmission terminal. Unlike the typical aggregation packet, the aggregation packet in accordance with an embodiment of the present invention includes more than one preamble. Further, transmit completion times t1 and t2 of the aggregation packets are different as shown.

When a packet error is generated, it is required to retransmit a corresponding packet. As described above, the packet errors may be reduced according to an embodiment of the present invention. Therefore, a retransmitted packet length of the typical aggregation packet may be shorter than that of the embodiment of the present invention as shown in FIG. 5. That is, although a time t3 of retransmit a packet for the typical aggregation packet is prior to that t4 according to the embodiment of the present invention, a transmit complete time t5 of the embodiment of the present invention is prior to that t6 of the typical aggregation packet.

That is, in an embodiment of the present invention, a time for initially transmitting a packet may be longer but a retransmission time may be reduced. Finally, throughput is improved in accordance with an embodiment of the present invention.

Figure 6:
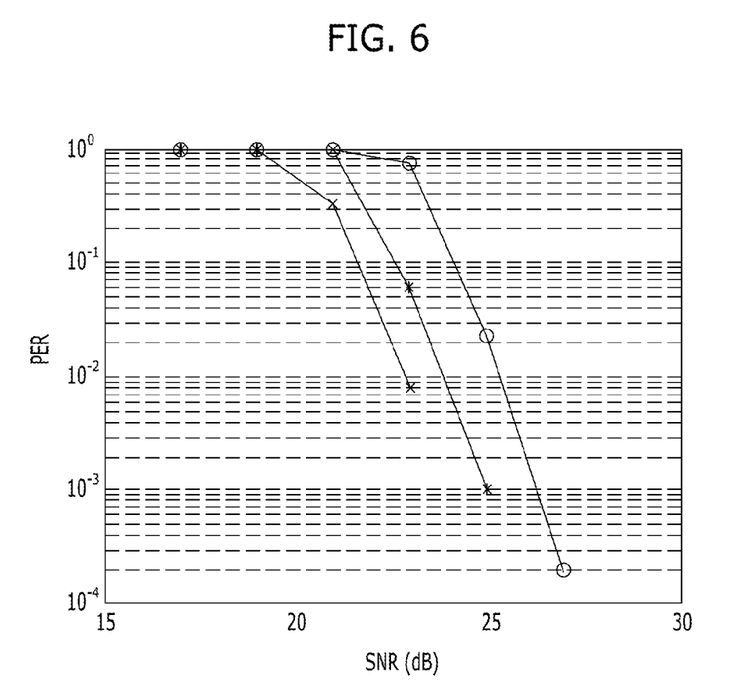
FIG. 6 is a graph showing a simulation result showing property between a packet error rate and a signal to noise ratio (SNR) when a packet is transmitted.

FIG. 6 is a graph showing a simulation result showing property of a packet error rate and a signal to noise ratio when a packet is transmitted.

When a 2×3 MIMO-OFDM technology with a bandwidth of about 40 MHz is used in a PHY layer and a 64-QAM modulation and 5/6 coding rate channel coding technology is employed, a data rate can be improved up to 300 Mbps. If a Block Ack and an aggregation mode are used in a MAC layer under this condition, maximum throughput of about 210 Mbps can be achieved by aggregating 40 packets each of 1000 bytes. However, such achievement can be obtained under an assumption of no channel variation and small noise. However, a real channel is always changed abruptly and has a lot of noises.

FIG. 6 shows a simulation result illustrating a packet error rate (PER) when 40 packets are aggregated under the above condition. Each packet is one of 1000, 10000, and 40000 bytes. In FIG. 6, a curve 'o', a curve '*', and a curve '×' indicate a PER for an aggregation packet including 40 40000-byte packets, a PER for an aggregation packet including 40 10000-byte packets, and a PER for an aggregation including 40 1000-byte packets, respectively.

As shown in the simulation result of FIG. 6, in case of 40000-byte packet, errors are generated in almost all packets below 23 dB. In case of 10000-byte packet, errors are generated in packets below 21 dB. In case of 1000-byte packet, errors are generated in almost all packets below 19 dB. Further, SNRs for 10% for PER are 21.5 dB, 22.5 dB, and 24.5 dB for above three cases.

As shown in this simulation, a PER performance is abruptly dropped from 100% to 1% between 20 dB and 25 dB. It is obvious that a packet length is very important factor under this situation. For example, although a PER for 1000-byte packet is only 1% when a SNR is 23 dB, a PER for 40000-byte packet is more than 95%. There is a significant difference between them.

Figure 7:
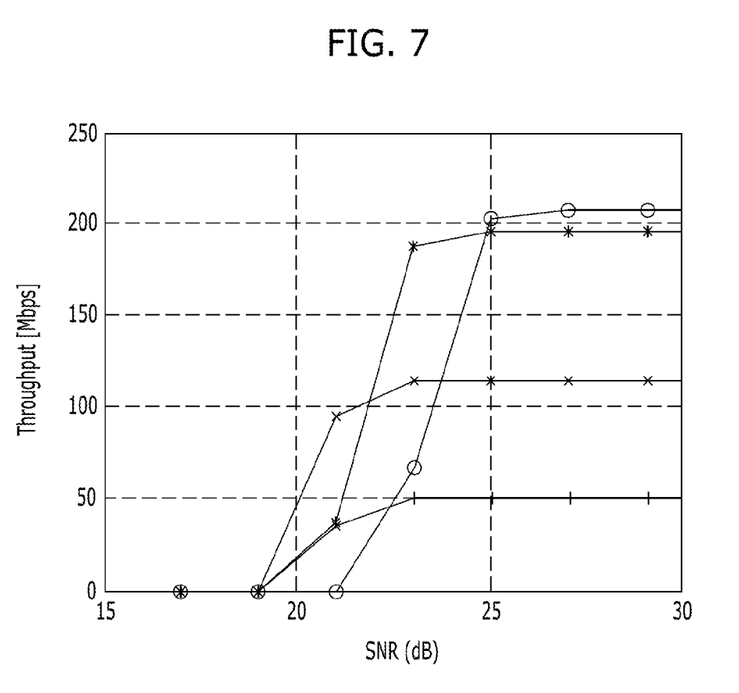
FIG. 7 is a graph showing a simulation result of a throughput performance according to a signal to noise ratio (SNR) and a preamble insertion cycle.

FIG. 7 is a graph showing a simulation result of a throughput performance according to a signal to noise ratio and a preamble insertion cycle. In FIG. 7, a curve 'o', a curve and a curve '×' denote 40000-byte aggregation packets having one preamble, four preambles, and 40 preambles, respectively. In FIG. 7, a curve '+' shows a simulation result of using a typical 1000-byte packet and a normal ACK.

As shown in FIG. 7, it is prefer to use one preamble for a channel having a signal to noise ratio (SNR) higher than 25 dB. Further, it is prefer to use four preambles for a channel having a SNR between 22 dB to 25 dB, and it is prefer to use forty preambles for a channel having a SNR between 20 dB and 22 dB.

Here, throughput for a typical packet is about 18% of throughput for an aggregation packet having one preamble. It is because of an interval between packets according to transmission of each packet and overhead by preambles of a PHY layer and an ACK packet. Since a preamble is inserted at each 1000-byte packet, an aggregation packet can be quickly response to channel variation. Therefore, an aggregation packet having preambles each inserted at each every 1000-byte packets is better than the typical packet in view of throughput. That is, the curve '×' is better than the curve '+' in view of throughput. Accordingly, it shows that aggregation is very effective.

Here, in case of a SNR required to achieve throughput of 50 Mbps, a SNR for an aggregation packet having preambles each inserted to every each 10000-byte packet is about 3 dB lower a SNR for a typical 1000-byte packet. Accordingly, it shows that aggregation is very effective.

Hereinafter, throughput efficiency according to an embodiment of the present invention will be analyzed using equations. The throughput can be calculated by Equation 1 below.

$$\text{Throughput} = L_{payload}/T_{total} \quad \text{Eq. 1}$$

As shown in Equation 1, throughput is a result of dividing a length of a data payload by a time required for transmitting data. Here, the time required for transmitting data includes an interval between packets, overhead including preambles and headers, and a time required for transmitting real data. Accordingly, through can be expressed as Equation 2 below.

$$\begin{aligned}T_{total} = &T_{DIFS} + CW + T_{pre} + T_{RTS} + T_{SIFS} + \\ &T_{pre} + T_{GTS} + Tpre + T_{A-MPDU} + T_{SLFS} + T_{pre} + \\ &T_{BA} + T_{SIFS} + T_{pre} + T_{A-MPDU} + T_{SIF} + T_{pre} + T_{BA}\end{aligned} \quad \text{Eq. 2}$$

According to Equations 1 and 2, a throughput efficiency of a MAC layer can be expressed as Equation 3 below.

$$\text{MAC efficiency} = \text{MAC Throughput}/\text{PHY rate} \quad \text{Eq. 3}$$

In Equation 3, The MAC efficiency is a result of dividing the throughput of a MAC layer by a data rate of a PHY layer. For example, when a 40000-byte aggregation packet is transmitted by aggregating forty 1000-byte packets, 40000-byte A-MPDU(40000) is transmitted according to a typical technology because it transmits an aggregation packet as it is. When errors are generated at ten packets, 10000-byte A-MPDU(10000) is retransmitted, which is a packet group where the errors are generated. In this case, a total transmission time is calculated as Equation 4 below.

$$T_{total} = T_{DIFS} + CW + T_{pre} + T_{RTS} + T_{SIFS} + T_{pre} + \quad \text{Eq. 4}$$
$$T_{GTS} + T_{SIFS} + T_{pre} + T_{A-MPDU(40000)} + T_{SIFS} + T_{pre} +$$
$$T_{BA} + T_{SIFS} + T_{pre} + T_{A-MPDU(40000)} + T_{SIF} + T_{pre} + T_{BA}$$

However, when 40 preambles are used in accordance with an embodiment of the present invention, an aggregation packet is transmitted by inserting a preamble at every four A-MPDU(10000) as shown in Equation 5. In this case, adaptability for channel variation is improved and an error generation packet is reduced. When error is generated in one packet, a total transmission time may be reduced because only 1000-byte A-MPDU(1000) is retransmitted.

$$T_{total} = T_{DIFS} + CW + T_{pre} + T_{RTS} + T_{SIFS} + T_{pre} + T_{GTS} + T_{SIFS} + \quad \text{Eq. 5}$$
$$T_{pre} + T_{A-MPDU(10000)} + T_{pre} + T_{A-MPDU(10000)} + T_{pre} +$$
$$T_{A-MPDU(10000)} + T_{pre} + T_{A-MPDU(10000)} + T_{SIFS} + T_{pre} +$$
$$T_{BA} + T_{SIFS} + T_{pre} + T_{A-MPDU(10000)} + T_{SIF} + T_{pre} + T_{BA}$$

As a result, it is not necessary to retransmit 9000-byte data by further inserting three preambles (32 us×3). Therefore, about 250 us may be gained in view of a transmission time when a 2×3 MIMO 64 QAM and 5/6 code rate modulation scheme is used.

Figure 8:
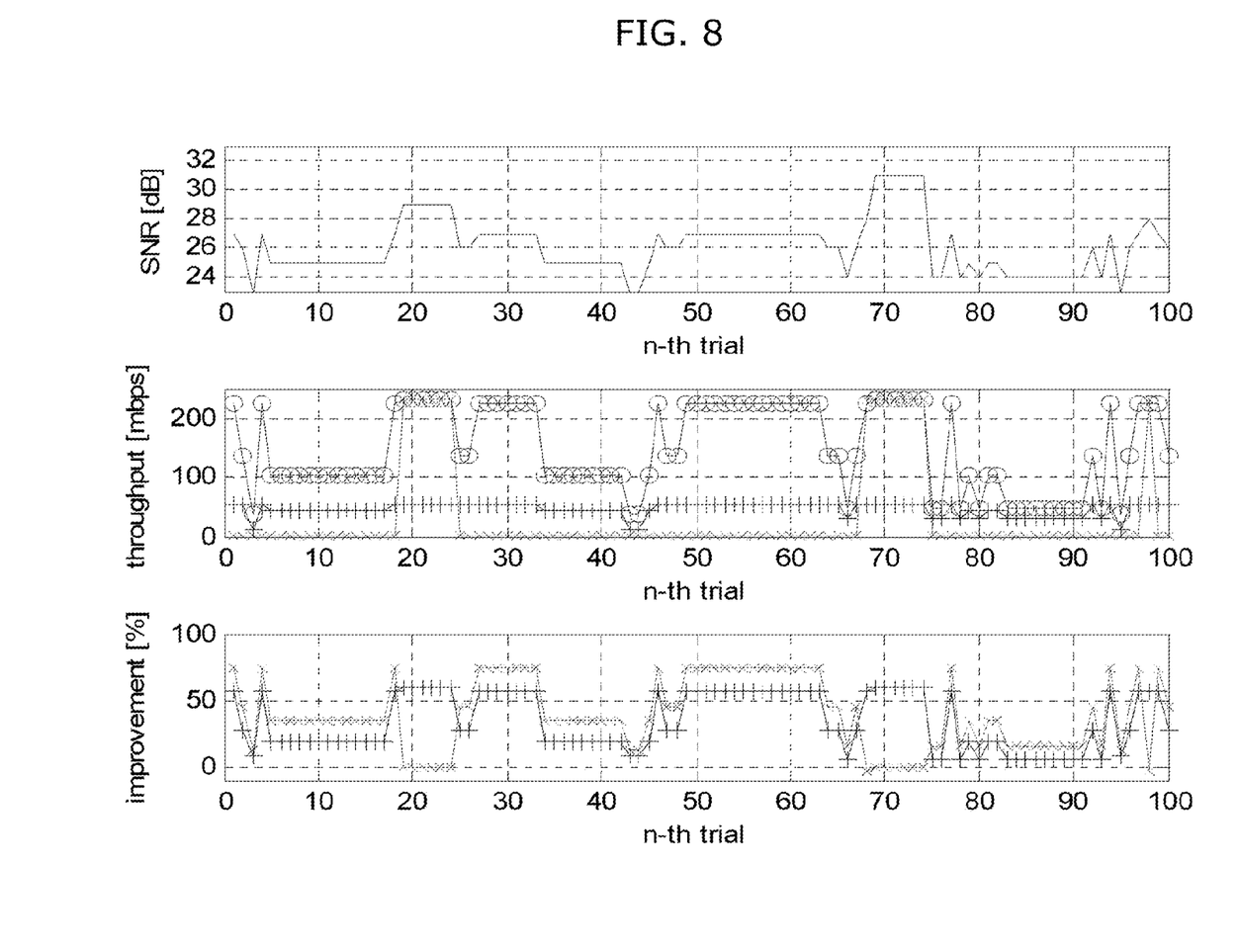
FIG. 8 is a graph for comparing an overall performance of an embodiment of the present invention with that of a typical related technology.

FIG. 8 is a graph for comparing an overall performance of an embodiment of the present invention with that of a typical related technology. The graph of FIG. 8 shows throughput and improvement according to SNR variation. In FIG. 8, a curve 'x' denotes a typical aggregation packet, a curve '+' indicates a typical packet not aggregated, and a curve 'o' indicates an aggregation according to an embodiment of the present invention.

As shown, in FIG. 8, in case of a typical aggregation packet, throughput is good only at a region where a SNR is higher than 28 dB and throughput is bad at other regions. Therefore, the typical aggregation packet is used only when a channel state is good. When a channel state is poor, a typical normal packet, which is not aggregated, is used, and also a normal ACK mode is used for an acknowledgement packet.

On the contrary, in case of the aggregation packet in accordance with an embodiment of the present invention, throughput is good and better in entire regions compared to the typical aggregation packet and the normal ACK mode. In the last graph showing improvement of FIG. 8, a curve 'x' shows improvement of the embodiment of the present invention compared with a typical aggregation packet, and a curve '+' shows improvement of the embodiment of the present invention compared with a normal packet.

Figure 9:
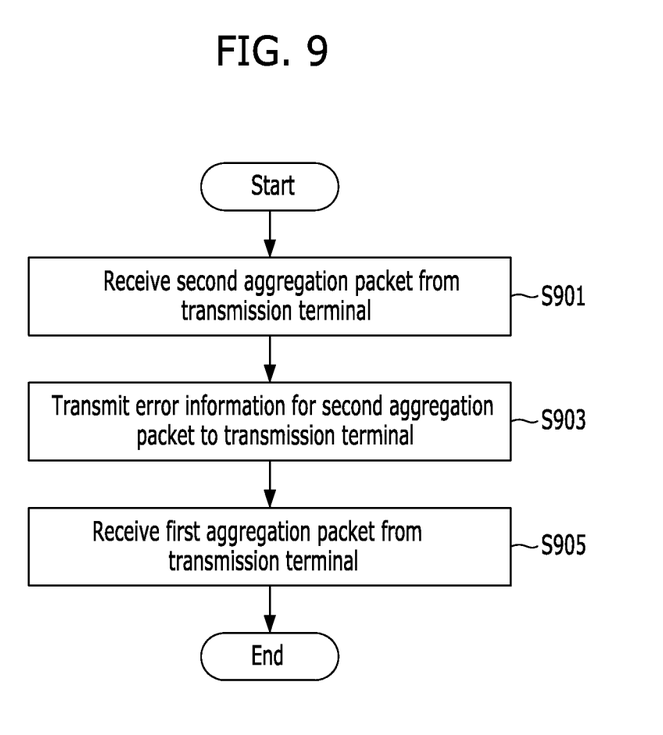
FIG. 9 is a flowchart illustrating a data reception method in accordance with an embodiment of the present invention.

FIG. 9 is a flowchart illustrating a data reception method in accordance with an embodiment of the present invention. A data transmission method of the reception terminal 111 of FIG. 1 will be described with reference to FIG. 9.

As shown in FIG. 9, at step S901, the reception terminal 111 receives a second aggregation packet from the transmission terminal 101. At step S903, the reception terminal 111 transmits error information about the second aggregation packet from the transmission terminal 101. The reception terminal 111 transmits error information by including the error information in a Block ACK for the second aggregation packet. At step S905, the reception terminal 111 receives the first aggregation packet from the transmission terminal 101.

The first aggregation packet is an aggregation with the number of preambles controlled or the packet size thereof controlled according to the error information. The first aggregation packet may be a packet transmitted by controlling a data transmit rate according to an embodiment of the present invention.

The reception terminal 111 estimates a channel state using preambles included in the first aggregation packet. When a channel state is poor, the number of preambles included in the first aggregation packet is increased. Therefore, the reception terminal 111 can further effectively and accurately estimate a channel.

Figure 10:
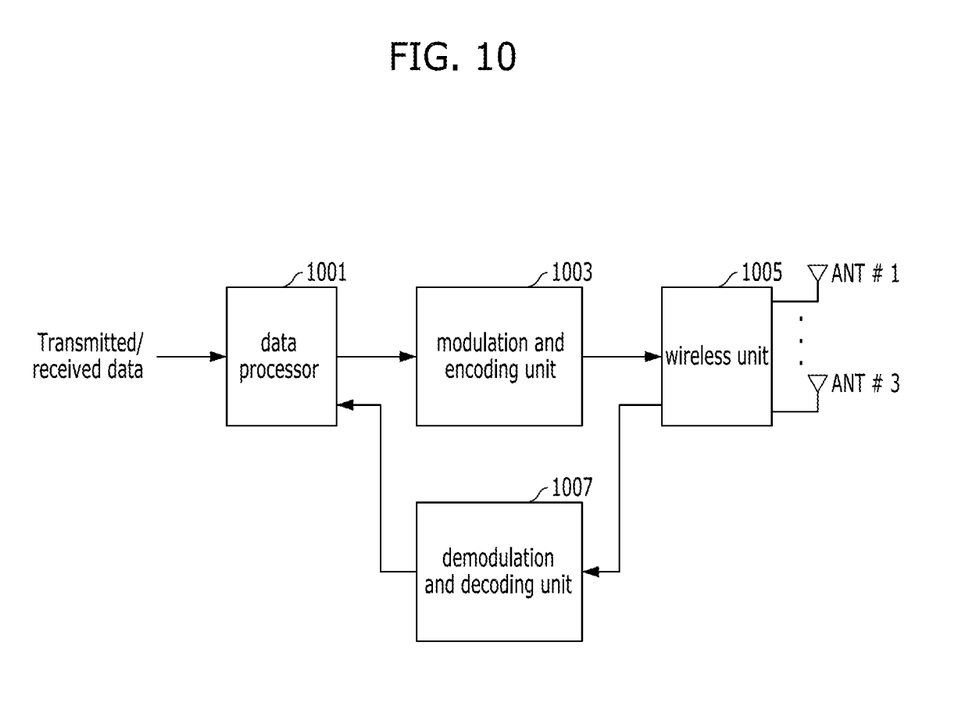
FIG. 10 is a diagram illustrating a wireless communication apparatus in accordance with an embodiment of the present invention.

FIG. 10 is a diagram illustrating a wireless communication apparatus in accordance with an embodiment of the present invention.

As shown in FIG. 10, the wireless communication apparatus in accordance with an embodiment of the present invention includes a data processor 1001, a modulation and encoding unit 1003, a wireless unit 1005, and a demodulation and decoding unit 1007. The wireless communication apparatus in accordance with an embodiment of the present invention includes the transmission terminal 101 and the reception terminal 111 of FIG. 1. Here, the data processor 1001 is equivalent to a MAC layer, the modulation and encoding unit 1003, the wireless unit 1005, and the demodulation and decoding unit 1007 are equivalent to a PHY layer.

The data processor 1001 generates an aggregation packet and transfers the generated aggregation packet to the modulation and encoding unit 1003. The data processor 1001 includes a function of the data processor 103 of FIG. 1. Here, the aggregation packet may be A-MPDU of FIG. 3.

The modulation and encoding unit 1003 modulates and encodes the aggregation packet from the data processor 1001 according to a predetermined communication scheme. Here, the modulation and decoding unit 1003 may control a data transmit rate by controlling a modulation and coding scheme according to a channel state and a terminal state. The modulated and encoded packet from the modulation and encoding unit 1003 is matched to a predetermined wireless transmission scheme, up-converted, and transmitted through each antenna ANT #1, . . . , ANT #n to a data reception apparatus. Here, the wireless unit 1005 and each antenna ANT #1, . . . , ANT #n are also a PHY layer. Meanwhile, the modulation and encoding unit 1003 may generate A-PPDU by aggregating a plurality of A-MPDUs transmitted from the data processor 1001.

When the wireless unit 1005 receives a Block ACK form the transmitted aggregation packet from the data receiving apparatus, the wireless unit 1005 performs a band down conversion process and a de-mapping process for the Block ACK. The down-converted and de-mapped Block ACK is transferred to the demodulation and decoding unit 1007. The demodulation and decoding unit 1007 demodulates and decodes the Block ACK and provides the demodulated and decode Block ACK to the data processor 1001.

The data processor 1001 extracts error information included in the Block ACK and generates an aggregation packet by controlling the number of preambles to be inserted into the aggregation packet or by controlling the size of the aggregation packet according to error distribution and error frequency. The aggregation packet in accordance with an embodiment of the present invention is transmitted to the data receiving apparatus through the modulation and encoding unit 1003 and the wireless unit 1005.

Meanwhile, the wireless unit 1005 receives an aggregation packet transmitted from other wireless communication apparatus. The aggregation packet is input through a plurality of antennas ANT #1, . . . , ANT #n. The wireless unit 1005 estimates a channel state using preambles included in the aggregation packet.

The demodulation and decoding unit 1007 demodulates and decodes a packet using the channel estimation value. The demodulated and decode packet is provided to the data processor 1001. The data processor 1001 determines whether error is generated in received packets or not. If error is not generated therein, the data processor 1001 transfers the data to an upper layer.

On the contrary, if error is generated therein, the data processor 1001 generates a Block ACK signal and provides the Block ACK signal to the modulation and encoding unit 1003. Accordingly, the modulation and encoding unit 1003 modulates and encodes the ACK signal according to a predetermined communication scheme. The modulated and encoded signal is converted to a transmission band signal and transmitted to other wireless communication apparatus through each antenna ANT #1, . . . , ANT #n.

Figure 11:
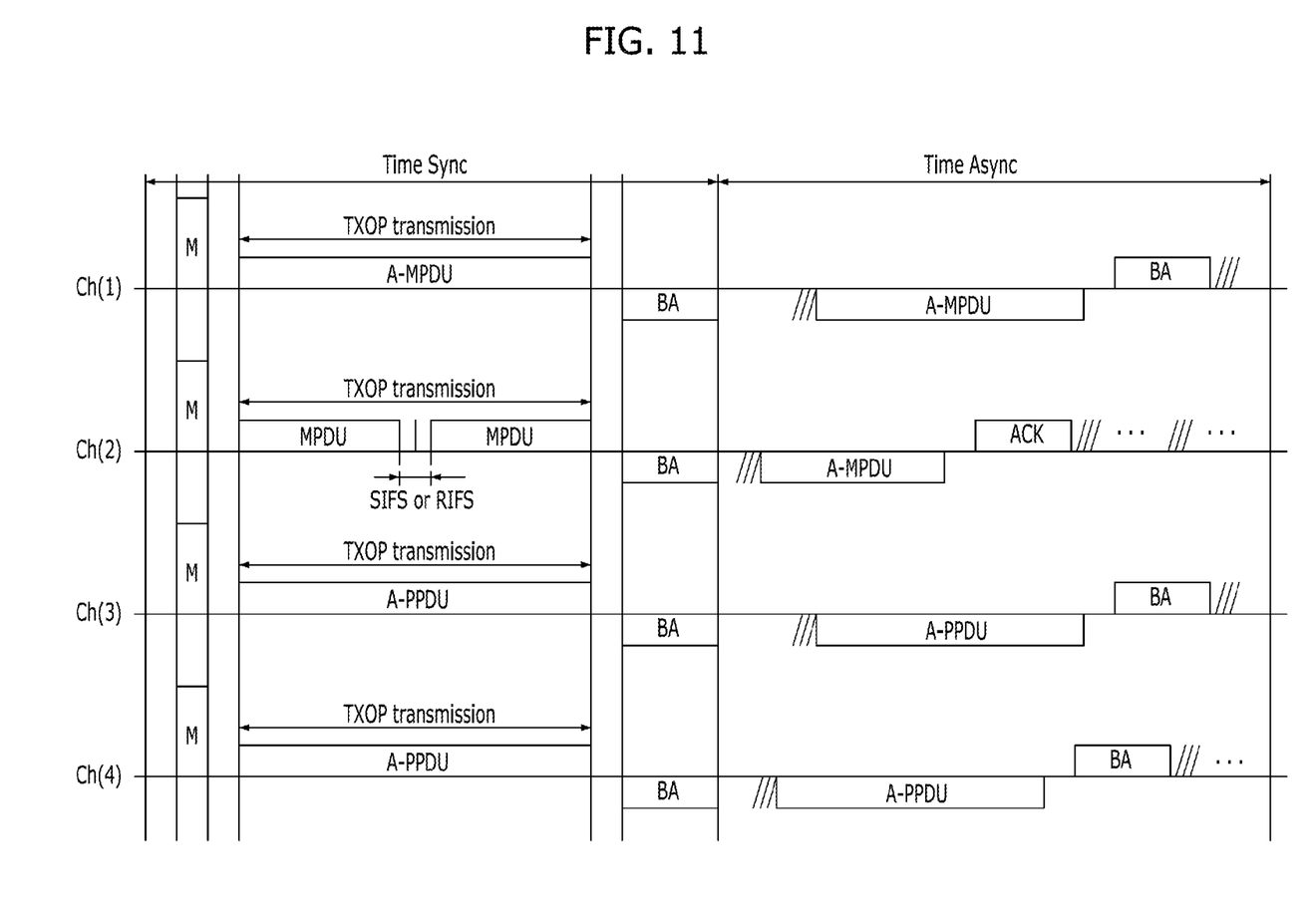
FIG. 11 is a diagram illustrating a wireless communication system in accordance with another embodiment of the present invention.

FIG. 11 is a diagram illustrating a wireless communication system in accordance with another embodiment of the present invention. In FIG. 11, the wireless communication system in accordance with an embodiment of the present invention may be a WLAN system using a multiple channel.

An embodiment of the present invention may be applied to a WLAN system using multiple channels. That is, a transmission terminal may transmit an aggregation packet in accordance with an embodiment of the present invention to at least one reception terminal using a channel allocated thereto.

As shown in FIG. 11, a transmission terminal transmits an aggregation packet and a normal packet to a reception terminal using a corresponding channel allocated thereto during a transmit opportunity period (TXOP) at a synchronous mode. In asynchronous mode, the transmission terminal asynchronously transmits packets to the reception terminal using a corresponding channel allocated thereto. A reception terminal transmits acknowledgment according to the synchronous mode or the asynchronous mode. Synchronization may be performed according to a management packet M defined as a protocol. The transmission terminal may transmit an aggregation packet in accordance with an embodiment of the present invention.

Figure 12:
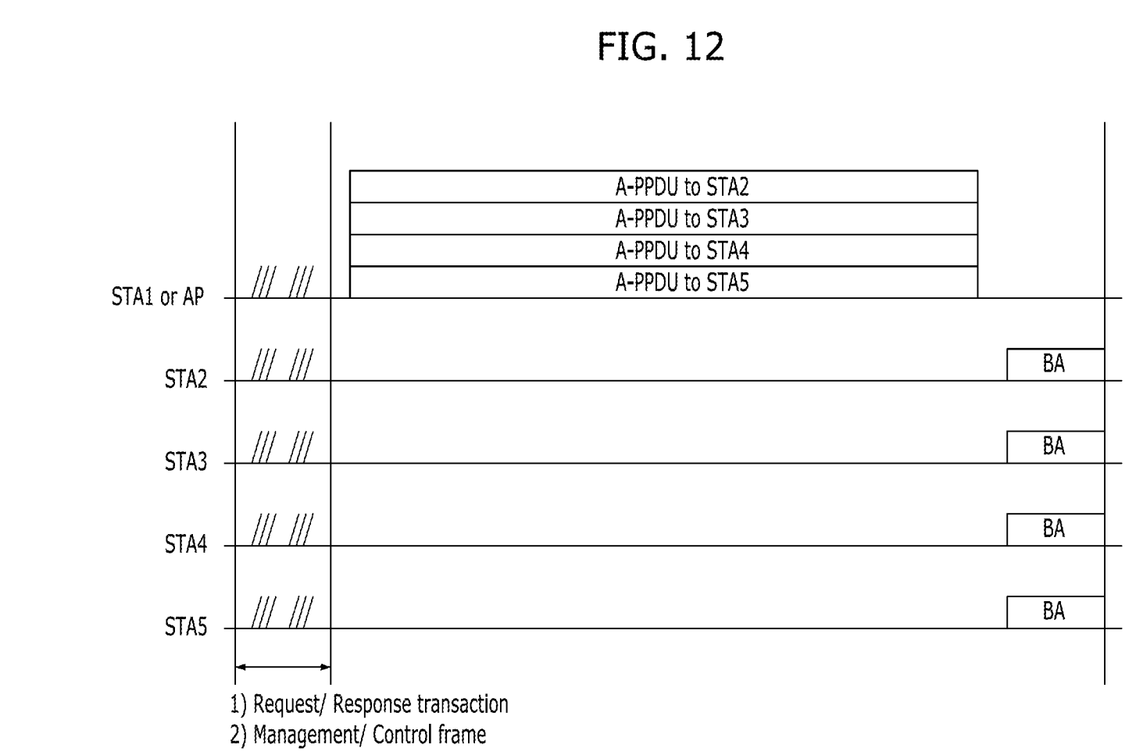
FIG. 12 is a diagram illustrating a wireless communication system in accordance with another embodiment of the present invention.

FIG. 12 is a diagram illustrating a wireless communication system in accordance with another embodiment of the present invention. In FIG. 12, the wireless communication system in accordance with an embodiment of the present invention may be a MU-MIMO WAN system. Here, MU-MIMO WAN stands for Multi-User Multiple Input Multiple Output (MU-MIMO) Wireless Local Area Network.

An embodiment of the present invention may be applied to the MU-MIMO WLAN system. That is, a transmission terminal may transmit an aggregation packet in accordance with an embodiment of the present invention to at least one reception terminal through beam-forming. Here, the transmission terminal may be an access point.

FIG. 12 illustrates that one transmission terminal or an access point transmits an aggregation packet to a plurality of reception terminals. However, the plurality of reception terminals may transmit an aggregation packet to the transmission terminal or the access point. Like FIG. 11, transmission and reception may be performed one of the synchronous mode and the asynchronous mode. The reception terminal transmits a Block ACK for a transmitted aggregation packet to the transmission terminal or the access point.

As described above, the data transmission and reception apparatus in accordance with an embodiment of the present invention improves throughput even in a wireless channel environment having serious noise and abrupt channel variation by controlling the number of preambles or by controlling the size of an aggregation packet according to a channel state or a terminal state when the aggregation packet is generated.

The method of the present invention described above can be realized as a program stored in a computer-readable recording medium such as CD-ROM, RAM, ROM, floppy disks, hard disks, magneto-optical disks and the like. Since the process can be easily implemented by those skilled in the art to which the present invention pertains, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A method for transmitting data for a wireless communication system, comprising:
 transmitting a second aggregation packet to a reception terminal;
 receiving error information for the second aggregation packet from the reception terminal;
 generating a first aggregation packet by controlling the number of preambles or by controlling a size of a packet according to a channel state of a channel formed to at least one reception terminal or according to a state of the reception terminal; and
 transmitting the first aggregation packet to the reception terminal,
 wherein the first aggregation packet is generated according to error information indicating the channel state and the state of the reception terminal.

2. The method of claim 1, wherein said generating a first aggregation packet comprises:
 comparing the number of error packets for the second aggregation packet with a predetermined threshold value using the error information;
 controlling the number of preambles according to the comparison result; and
 generating the first aggregation packet including the controlled number of preambles.

3. The method of claim 2, wherein in said controlling the number of preambles,
 the number of preambles is controlled by controlling a preamble insertion cycle for the first aggregation packet.

4. The method of claim 1, wherein said generating a first aggregation packet comprises:
 comparing error distribution of the second aggregation packet with a predetermined threshold value using the error information;
 deciding a size of the first aggregation packet according to the comparison result; and
 generating the first aggregation packet by controlling the number of packets included in the first aggregation packet according to the decision result.

5. The method of claim 4, wherein in said comparing error distribution of the second aggregation packet with a predetermined threshold value,
 an error generation rate from a predetermined packet to a last packet included in the second aggregation packet with the predetermined threshold value.

6. The method of claim 1, wherein the error information is information included in a Block ACK for the second aggregation packet.

7. The method of claim 1, wherein the first aggregation packet is an aggregation packet generated in a physical (PHY)

layer by aggregating a plurality of aggregation packets generated in a medium access control (MAC) layer of the wireless communication system.

8. The method of claim 7, wherein the first aggregation packet includes packets for other reception terminals as well as packets for the reception terminal, and
wherein in said transmitting the first aggregation packet to the reception terminal,
the first aggregation packet is transmitted by controlling a data transmit rate of each packet included in the first aggregation packet.

9. The method of claim 1, wherein the wireless communication system is a multi channel or multi user (MU) multiple input multiple output (MIMO) wireless local area network (WLAN) system.

10. A method for transmitting data for a wireless communication system, comprising:
transmitting a second aggregation packet to a reception terminal;
receiving error information for the second aggregation packet from the reception terminal;
generating a first aggregation packet; and
transmitting the first aggregation packet by controlling a data transmit rate according to a channel state of a channel formed to at least one reception terminal and a state of the reception terminal,
wherein the data transmit rate of the first aggregation packet is controlled according to the error information indicating the channel state and the state of the reception terminal.

11. The method of claim 10, wherein the first aggregation packet is generated by controlling the number of preambles or by controlling a size of a packet according to the channel state or the state of the reception terminal.

12. The method of claim 10, wherein the data transmit rate of the first aggregation packet is controlled by controlling a modulation and coding scheme.

13. An apparatus for transmitting data for a wireless communication system, comprising:
a data processor configured to generate a first aggregation packet by controlling the number of preambles or by controlling a size of packet according to a channel state of a channel to at least one reception terminal or according to a state of the reception terminal; and
a data transmitter configured to transmit the first aggregation packet and a second aggregation packet to the reception terminal;
a data receiver configured to receive error information for the second aggregation packet from the reception terminal,
wherein the first aggregation packet is generated according to the error information indicating the channel state and the state of the reception terminal.

14. The apparatus of claim 13, wherein the data processor generates the first aggregation packet by comparing the number of error packets or error distribution for the second aggregation packet with a predetermined threshold value using the error information, and controlling the number of preambles or a size of the first aggregation packet according to the comparison result.

15. The apparatus of claim 13, further comprising:
a modulation and encoding unit configured to modulate and encode the first aggregation packet according to a predetermined communication scheme,
wherein the data transmitter transmit the modulated and encoded first aggregation packet to the reception terminal.

16. A method for receiving data for a wireless communication system, comprising:
receiving a second aggregation packet from a transmission terminal;
transmitting error information for the second aggregation packet to the transmission terminal; and
receiving a first aggregation packet from the transmission terminal,
wherein the first aggregation packet is generated by the transmission terminal according to the error information,
wherein the number of preambles or a size of a packet in the first aggregation packet are controlled by the transmission terminal according to the error information,
wherein the error information indicates a channel state of a channel formed to a reception terminal and a state of the reception terminal.

17. The method of claim 16, further comprising:
performing channel estimation using the preamble.

18. The method of claim 16, wherein the error information is information included in a Block ACK for the second aggregation packet.

19. An apparatus for receiving data for a wireless communication system, comprising:
a data receiver configured to receive second and first aggregation packets from a transmission terminal; and
an information transmitter configured to transmit error information for the second aggregation packet to the transmission terminal,
wherein the first aggregation packet is generated by the transmission terminal according to the error information,
wherein the number of preambles or a size of packet in the first aggregation packet are controlled by the transmission terminal according to the error information,
wherein the error information indicates a channel state of a channel formed to a reception terminal and a state of the reception terminal.

* * * * *